US008817094B1

(12) United States Patent
Brown et al.

(10) Patent No.: US 8,817,094 B1
(45) Date of Patent: Aug. 26, 2014

(54) VIDEO STORAGE OPTIMIZATION

(75) Inventors: Robert K. Brown, Edina, MN (US); Jason D. Reasoner, Minneapolis, MA (US); Neal B. DePape, Minnetonka, MN (US); Robert F. Foster, Ramsey, MN (US)

(73) Assignee: Target Brands, Inc., Minneapolis, MN (US)

( * ) Notice: Subject to any disclaimer, the term of this patent is extended or adjusted under 35 U.S.C. 154(b) by 672 days.

(21) Appl. No.: 12/712,720

(22) Filed: Feb. 25, 2010

(51) Int. Cl.
*H04N 7/18* (2006.01)

(52) U.S. Cl.
USPC .......................................... 348/143; 348/159

(58) Field of Classification Search
USPC ................................ 348/143, 159
See application file for complete search history.

(56) References Cited

U.S. PATENT DOCUMENTS

| | | | |
|---|---|---|---|
| 5,097,328 A | 3/1992 | Boyette |
| 5,111,291 A | 5/1992 | Erickson et al. |
| 5,455,561 A | 10/1995 | Brown |
| 5,551,021 A | 8/1996 | Harada et al. |
| 5,581,625 A | 12/1996 | Connell |
| 5,974,219 A | 10/1999 | Fujita et al. |
| 6,011,537 A | 1/2000 | Slotznick |
| 6,016,139 A | 1/2000 | Terasawa et al. |
| 6,195,121 B1 | 2/2001 | Huang et al. |
| 6,714,236 B1 | 3/2004 | Wada et al. |
| 6,757,906 B1 | 6/2004 | Look et al. |
| 6,788,333 B1 | 9/2004 | Uyttendaele et al. |
| 6,920,281 B1 | 7/2005 | Agnibotri et al. |
| 7,260,309 B2 | 8/2007 | Gutta |
| 7,552,460 B2 | 6/2009 | Goldman |

| | | | |
|---|---|---|---|
| 2002/0012517 A1 | 1/2002 | Ichioka et al. |
| 2003/0212567 A1 | 11/2003 | Shitani et al. |
| 2004/0055020 A1 | 3/2004 | Delpuch |
| 2005/0050578 A1 | 3/2005 | Ryal |
| 2005/0073585 A1 | 4/2005 | Ettinger et al. |
| 2005/0271251 A1* | 12/2005 | Russell et al. ................ 382/103 |

(Continued)

FOREIGN PATENT DOCUMENTS

| | | |
|---|---|---|
| EP | 1 387 583 B1 | 12/1999 |
| JP | 09-295698 | 11/1997 |
| JP | 2003-242587 | 8/2003 |
| JP | 2003-244506 | 8/2003 |
| WO | WO2004/063891 | 7/2004 |
| WO | WO2008/107686 | 9/2008 |

OTHER PUBLICATIONS

"Connecticut Department of Transportation", http://www.dotct.state.ct.us/trafficcam.aspx?dotNav=[2004].

(Continued)

*Primary Examiner* — Glenford Madamba
(74) *Attorney, Agent, or Firm* — Merek, Blackmon & Voorhees, LLC (57) ABSTRACT

In an illustrative implementation, a system for video storage optimization analyzes user activity to determine how to optimally store video. In a preferred embodiment, a security system records video from a plurality of security cameras and stores the video at the security system and/or a server system, along with associated metadata. The server system monitors user activity, such as live and recorded video viewing behavior, and queries for videos. The server system collects user video viewing behavior statistics, determines trends, and stores both personnel-specific and enterprise-wide settings. An optimization engine analyzes the video info, personnel-specific settings, enterprise-wide settings, and user statistics to determine a storage factor for a video. The optimization engine then determines if a video meets storage factor thresholds and settings for compression or deletion.

17 Claims, 5 Drawing Sheets

(56) References Cited

U.S. PATENT DOCUMENTS

| | | | |
|---|---|---|---|
| 2006/0053342 A1 | 3/2006 | Bazakos et al. | |
| 2006/0078047 A1 | 4/2006 | Shu et al. | |
| 2006/0095317 A1 | 5/2006 | Brown et al. | |
| 2007/0257896 A1 | 11/2007 | Huh | |
| 2007/0286581 A1 | 12/2007 | Boston et al. | |
| 2008/0059274 A1 | 3/2008 | Holliday | |
| 2008/0297599 A1* | 12/2008 | Donovan et al. | 348/143 |
| 2009/0080861 A1 | 3/2009 | de Klerk et al. | |
| 2010/0208064 A1* | 8/2010 | Liu et al. | 348/143 |

OTHER PUBLICATIONS

"Maidenhead Rowing Club River Thames Web Camera-About the View," http://www.maidenheadrc.org.uk/webcam/things_to_spot.htm, [1998].

"Today-Okoboji Live-Okoboji Online," http://www.okoboji.com/live/today/, [2002].

"Web Cam: Iowa State University," http://www/iastate.edu/webcam/webcam.html, [2001].

* cited by examiner

FIG. 5

VIDEO STORAGE OPTIMIZATION

BACKGROUND

Video monitoring systems are commonly used to monitor various commercial or retail locations such as stores, warehouses, athletic facilities, and the like. In general, video monitoring systems are used to monitor various interior locations (e.g., high-traffic aisles, security sensitive areas, etc.) and exterior locations (e.g., parking lots, loading docks, external doors, etc.) of such facilities.

The purposes for video monitoring vary, depending on the type of facility or the facility location. For example, video monitoring in a jewelry store is used primarily for store security, and may help to prevent theft or to identify perpetrators and recover merchandise after a theft has occurred. As another example, video monitoring in an athletic facility is used primarily for safety purposes or to monitor for overflow capacity of a particular area.

Regardless of the purpose, trained personnel can monitor video in real-time in order to react to ongoing incidents, or can monitor and review recorded video to study previous incidents. For example, stored video may be used for training purposes, such as demonstrating an accident or shoplifting prevention techniques. As another example, a theft captured on video may be used as evidence by law enforcement. Videos are generally stored on magnetic tapes, optical discs, hard drives, or flash-based storage, to name a few examples, in an analog or digital format.

Due to the large volume of data associated with a typical video recording, videos are often compressed. A variety of compression methods (e.g., MPEG-1, MPEG-2, etc) and standards (e.g., lossy or lossless) may be selected, based on media limitations and associated storage limitations. For example, spatial compression, temporal compression, and motion compensation are different methods often used in conjunction to reduce file size. Many video compression methods depend on limits to human perception, such as discrete cosine transformations and chroma subsampling.

SUMMARY

In an illustrative implementation, a system for video storage optimization analyzes user activity to determine how to optimally store video. In a preferred embodiment, a security system records video from a plurality of security cameras and stores the video at the security system and/or a server system, along with associated metadata. The server system monitors user activity, such as live and recorded video viewing behavior, and queries for videos. The server system collects user video viewing behavior statistics, determines trends, and stores both personnel-specific and enterprise-wide settings. An optimization engine analyzes the video info, personnel-specific settings, enterprise-wide settings, and user statistics to determine a storage factor for a video. The optimization engine then determines if a video meets storage factor thresholds and settings for compression or deletion. If it does not, the optimization engine determines if the video meets a storage factor and settings for compression. The optimization engine uses the results of calculating a storage factor to adjust weightings and algorithms for future calculations of storage factors.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION OF ILLUSTRATIVE IMPLEMENTATIONS

Illustrative implementations of computer-based systems and methods for optimizing video storage are described. For example, a video security system in a retail environment includes multiple cameras that produce large amounts of video data, which may be viewed in real-time, or may be stored for later review. A relatively small proportion of the video captures activity or motion, resulting in large quantities of redundant or low-quality data, from a security or safety standpoint. The described systems and methods enable video storage optimization, based on several factors, including, but not limited to, monitored behavior of one or more video monitoring system users (e.g., employees, researchers, etc.), and time period expirations. Video storage optimization techniques enable an efficient use of system resources.

Figure 1:
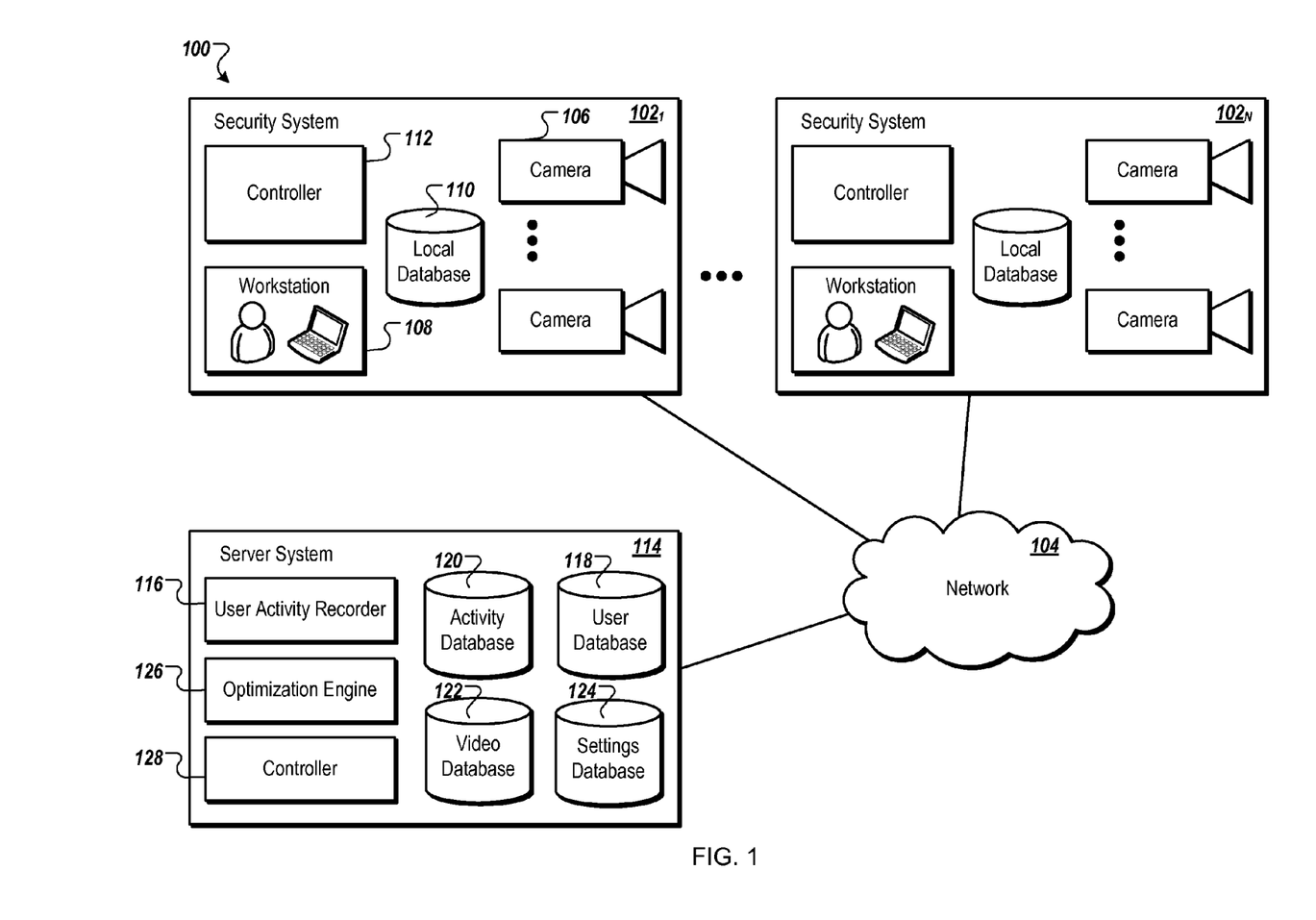
FIG. 1 is an example system for video storage optimization.

Referring to FIG. 1, an example system 100 for optimizing video storage is shown. In some configurations, the video storage optimization system 100 includes components such as a security system 102$_1$ and a server system 114. Components in the system 100 communicate via a network 104 using wired or wireless protocols, or a combination thereof.

As shown, the security system 102$_1$ includes multiple cameras, a workstation for a store security officer, and a controller. Additionally, the security system 102$_1$ includes software and hardware components used for recording information associated with incidents such as theft, vandalism, disorderly conduct, and employee and customer safety, to name a few examples. Recorded data can be analyzed, transmitted, received, modified, and deleted recorded data by the security system 102$_1$. For example, video data and recorded viewing behavior is transmitted via the network 104 to an offsite storage facility, such as a corporate server, where the videos are stored and analyzed.

Optionally, additional security systems, similar or identical to the security system 102$_1$ are connected to the network 104 and are configured for transmitting and receiving data. For example, a retail store chain includes a number N of retail stores, each with a security system 102$_N$, similar or identical to the security system 102$_1$ each configured to record and transmit video and recorded viewing behavior. Features included in the security system 102$_1$ are optionally present in security system 102$_N$.

The security system 102$_1$ includes at least one video camera 106 for capturing and transmitting video. Although the security system 102$_1$ includes multiple cameras, optionally, another security system 102$_N$ includes a single camera, or no cameras, but performs similar functions as the security system $102_1$. Various cameras (e.g., camera 106) in the security system $102_1$ are configured to view and record video from various locations (e.g., interior and exterior) and from various vantage points, and are configured to be controlled (e.g., moved, panned, tilted, zoomed, focused, etc.) by the system user. Optionally, multiple cameras are configured to view and record activity associated with a similar store location. For example, a second camera view is sometimes useful for viewing people or objects included in an incident that are occluded from a second camera view by shelves or by other people. As another option, the video camera 106 or a system operating in association with the camera records audio with the video.

The security system $102_1$ also includes a workstation 108 (e.g., a computer system at a security desk). The workstation 108 includes software and hardware to enable the user to view and manage live video footage captured by one or more cameras (e.g., camera 106), video stored locally at the security system $102_1$, or video stored at another location connected to the network 104. For example, store security personnel can use the workstation 108 to review live or recorded video from one or more store cameras. Additionally, the workstation 108 enables the user to view video captured by multiple cameras simultaneously, to control the cameras (e.g., move, pan, tilt, zoom, focus, etc.), and to associate notes with the captured video. For example, a security employee can use the workstation 108 to control a camera to capture video of a subject (e.g., a potential shoplifter), to zoom in on the subject, and to flag the captured video if the subject is suspected of a crime or safety violation.

The security system $102_1$ also includes a local database 110 for local video storage, and local storage of other information such as user viewing behavior and video metadata. For example, the local database 110 stores video captured and recorded by a camera included in the security system $102_1$, such as the camera 106, associated metadata or notes, and associated user information and user activity information. Associated video metadata includes information such as timestamps, camera direction and control information, store identification, area identification, and/or video identification, to name a few examples. Optionally, the local database 110 includes rules associated with the storage of video and/or associated information. For example, a video storage rule can implement a retention policy of X days for all stored video. As another option, the user has the ability to flag a video stored in the local database 110 or another database, depending on user access level. For example, a security officer may flag a video at a workstation for further review, or to preserve the video as evidence of a crime.

The security system $102_1$ also includes a controller 112 for managing communications between the various components in the security system $102_1$, and for communicating with other systems connected to the network 104. Additionally, the controller 112 manages and controls access to video stored in the local database 110. Optionally, the controller 112 manages system configuration settings (e.g., video retention settings, etc.).

As shown, the system 100 includes a server system 114, connected to the network 104, that includes components such as a user activity recorder 116, an optimization engine 126, and a controller 128. Additionally, the server system 114 includes databases such as a user database 118, an activity database 120, a video database 122, and a settings database 124. In some implementations, the server system 114 is a corporate server for transmitting, receiving, storing, and performing analytics on video data from many retail locations. The server system 114 manages and updates algorithms for video storage.

The user activity recorder 116 records data related to activities performed by the user at workstation 108, in addition to contextual information (e.g. video date and time, video length, store location, camera location, camera direction, whether activity occurs in the video, whether the video has been flagged for further review, etc.) associated with reviewed video. For example, the user activity recorder 116 may note that the user tends to not review video more than 48 hours old, and that the user tends to not review video from other shifts. Recorded user activity includes information related to user interaction with video (e.g., how a user typically fast-forwards, rewinds, pauses, zooms, or reviews in slow motion video from certain camera locations, etc.), and the date and time the user deletes or archives video. For example, the user activity recorder 116 may note that the user typically deletes video that contains no motion. Additionally, user activity includes how often, and/or the number of times a video or a portion of a video is reviewed, and details related to the selection of and interaction with live video (e.g. store locations, camera locations, camera directions, activity in the video, etc.). For example, the user activity recorder 116 may note that the user typically zooms in a particular location, such as an electronics aisle. Certain aspects of user activity do not involve direct camera control or video playback. For example, the user activity recorder 116 may note that the user performs a query for video captured at a particular place, date, and time, and details of the query may be processed for further analysis. User activity data is managed (e.g., added, modified, deleted, etc.) by the user activity recorder 116 and is stored in the activity database 120.

The user database 118 stores information about users of the system 100, such as user names, passwords, access levels, store locations, and/or shifts worked, to name a few examples. For example, as the user logs into the server system 114 (e.g., via a computer terminal) to review video, the system 114 verifies the user by accessing the user database 118. Optionally, the user database 118 includes data similar to data stored by the local database 110.

The activity database 120 stores information related to system user activity. Instances of user activity are associated with other instances of user activity performed by the same and/or different users. For example, the number of times the user reviews a video segment may be associated with one or more additional factors, such as the camera location of the reviewed video segment, or queries performed by the user to access the video segment. Optionally, instances of user activity are associated with external data (e.g. data stored in other databases). For example, the cameras controlled by the user, or video captured by the cameras, are associated with the dollar values of items in the camera area or video range, or with the average traffic in the area or range. User activity is associated with information in the user database 118, for example, by associating a user activity instance with the corresponding entry in the user database. The activity database 120 optionally includes data similar to data stored by the local database 110.

The video database 122 stores video and associated information (e.g. date, time, audio, store location, camera direction, video length, user flags, etc.). Optionally, the video is stored in an MPEG format and associated with metadata in a relational database including sufficient space to store videos and associated information from multiple locations, such as the security systems $102_1$, $102_N$, etc. The video database 122 optionally includes data similar to data stored by the local database 110. For example, the video database 122 may act as a backup or contains a mirror of the videos and other information stored in the local database 110. As another option, videos stored in the video database 122 are archived or maintained for a longer period of time than videos stored in the local database 110. For example, storage space of the local database may be relatively limited in comparison to the video database 122 operating under an extensible architecture, such as a server farm. As another option, some or all of the videos stored in the video database 122 are compressed. For example, videos unlikely to be retained are compressed with a lower resolution or frame rate, or may be compressed using some other technique.

The settings database 124 includes global and user settings, such as video retention policies. Retention policies depend on factors such as store location, camera location, or whether a video has been flagged, to name a few examples. Additionally, retention policies indicate when to delete or compress a video. For example, a policy may be specified that videos are to be compressed after one week of storage, unless the videos are flagged for further review. The retention policies are specified at a store, camera, or user level. For example, videos from checkout areas and electronics may be retained longer and/or at a higher resolution than other videos. As another example, videos from high crime stores may be retained longer than other stores. Global settings include floors and ceilings above which or below which policies cannot be set. User settings include similar policies as the global settings, set at a user level. For example, a user who works once a week may wish to retain videos longer than a user who works a daily shift. Some user settings are set automatically, without direct user control. For example, the optimization engine 126 determines user settings based on user activity. Optionally, global and local settings are different for users with different access levels. For example, manager and security directors may have the ability to override policies.

The optimization engine 126 determines and implements strategies and methods for optimizing video storage, based on data received from the user activity recorder 116 and the various databases in the server system 114. To optimize video storage, the optimization engine 126 collects statistics for user activity and modifies policies in the settings database 124. Additionally, the optimization engine 126 determines statistical thresholds for user-specific settings. For example, the optimization engine 126 may determine that the user typically reviews videos older than 48 hours. In the present example, the optimization engine 126 sets the user-specific policy to include a longer retention period that does not exceed any global floors or ceilings. The optimization engine 126 also determines statistical thresholds for global settings based on user activity. For example, a factor that applies to many users may be generalized and applied to all users in a group. Storage algorithms are optionally weighted towards user-specificity or enterprise-wide consistency. For example, depending on the method for weighting the storage algorithms, if a subset of users views videos older than seven days, the optimization engine 126 either marks seven-day-old videos for deletion (e.g., to enforce enterprise-wide consistency), or modifies user settings associated with the subset of users, to enable the users to store the seven-day-old videos for a longer period of time. The optimization engine weighs multiple factors to determine how to modify user-specific and/or global policies, for example.

The controller 128 performs functions similar to the controller 112. For example, the controller 128 manages connections to the network 104 and systems external to the server system 114. Additionally, the controller 128 manages communications and access to the various components of the server system 114.

Figure 2:
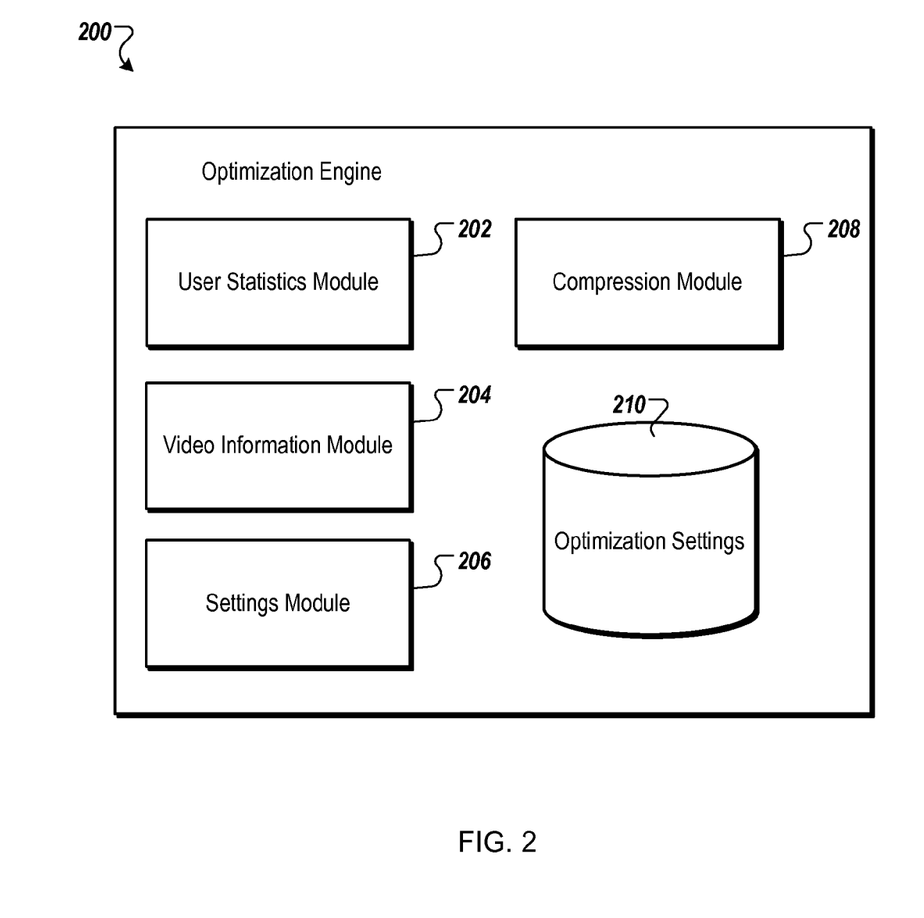
FIG. 2 is a diagram of an example optimization engine.

Referring to FIG. 2, a diagram of an example optimization engine 200 is shown. For example, the optimization engine 200 may be similar to the optimization engine 126 in the server system 114 shown in FIG. 1. The optimization engine 200 includes machine learning algorithms and components, such as adaptive systems, neural networks, fuzzy logic, and data mining algorithms, to name a few examples. The optimization engine 200 determines the minimum and/or maximum number of days to store a video before deleting or compressing the video, by analyzing user behavior, user statistics, and other information such as video metadata.

The optimization engine 200 includes a user statistics module 202 for recording and maintaining user activity statistics. The user activity statistics are obtained from information in the user database 118 and the activity database 120. Along with other information, such as global and local settings, the optimization engine 200 uses the user activity statistics to determine thresholds for storage policies. For example, the user statistics module 202 accesses any or all of the activity data in the activity database 120, and generates statistics based on the data, such as averages, correlations, best fits, significance of variables, and the like. Statistics related to general user behavior may be derived by the user statistics module 202, using data associated with one or more users. For example, the user statistics module 202 determines that on average, users view videos from certain cameras more often than cameras located elsewhere in a particular store. In the present example, the optimization engine 200 may determine that videos captured by those cameras are to be retained longer than videos from other cameras, and that videos from the other cameras are to be compressed or deleted sooner than the retained videos. Additionally, the user statistics module 202 analyzes trends in user queries for particular videos, and the optimization engine 200 predicts which videos are likely to be queried by one or more users in the future, and therefore, which videos are to be saved.

The optimization engine 200 also includes a video information module 204 for accessing video files and associated information. The video information module 204 obtains information from either the video database 122 or the local database 110 related to videos analyzed by the optimization engine 200. For example, the video information module 204 retrieves information indicating a video is seven days old, and that the video is recorded from a particular warehouse location and camera. The optimization engine 200 uses information from the video information module 204 in addition to other information, such as statistics from the user statistics module 202, to determine the statistical thresholds for deleting or compressing video.

The optimization engine 200 also includes a settings module 206 for handling global and user settings. The settings module 206 reads, writes, and manages information in the settings database 124. The optimization engine 200 uses the settings module 206 to read the current settings from the settings database 124, and operates in association with the user statistics module 202 and the video information module 204 to determine new global and user settings. Additionally, the optimization engine 200 uses the settings module 206 to write the new settings. The settings module 206 determines which settings cannot be overwritten, for example, by acting as a gatekeeper to ensure that certain global floors, ceilings, or other requirements are not modified.

The optimization engine 200 also includes a compression module 208 for generating decisions and determining methods for compressing video (e.g., video stored in the video database 122 or local database 110). For example, the compression module 208 compresses seldom-accessed video, or video that is unlikely to be reviewed, in order to save space. The compression module 208 works with the user statistics module 202, the video information module 204, and/or the settings module 206 to determine when and how to compress video. The compression module 208 compresses video using methods including, but not limited to, reducing bitrates, frame rates, resolution, or other video features. Optionally, the compression module 208 deletes or compresses individual frames or sections of video in which little or no activity takes place. For example, if one or more video segments showing activity in a shopping aisle (e.g., in a retail environment) does not include motion (e.g., caused by shoppers, employees, etc.), the compression module 208 may remove the video segments to conserve storage space. The compression module 208 uses lossless or high quality compression on video to be retained with a high level of quality. For example, high quality video can often be used to identify perpetrators of a crime. As another option, the degree to which video is compressed depends on factors such as available storage space (e.g., on the server system 114). For example, if a large quantity of video data is to be stored and a small amount of storage space is available, the compression module 208 adjusts compression parameters such that the video is compressed to a greater degree than if a small quantity of video data were to be stored, or a large amount of storage space were available. As another option, the compression module 208 compresses video by extracting a series of thumbnail images representative of the video. For example, a record of a video that has been archived or deleted may be maintained with a few select frames from the video that take significantly less storage space than the video itself. As another option, a compressed video is maintained at the local database 110, and the uncompressed data is maintained at the server system 114 or an archive location.

The optimization engine 200 includes an optimization settings database 210 which stores and provides settings for the optimization engine, such as algorithms and weightings for optimizing video. The settings stored in the optimization settings database 210 are modified by the optimization engine 200. For example, by collecting statistics related to user behavior, the optimization engine 200 modifies settings to improve the algorithms it uses to optimize video storage. The optimization engine 200 modifies settings in the optimization settings database 210, for example, by assigning some user activities a higher weight than others. For example, activities performed by a user at a manager level, or a level associated with multiple years of experience is weighted more heavily than activities performed by a novice user. As another example, multiple instances of user activity performed by users are taken in aggregate and are weighted higher than activities performed by a small number of individuals at a higher experience level.

In some implementations, each user, instance of user activity, or any number of other factors are assigned a coefficient which represents the weighting of that particular user, activity, or factor. These coefficients are used in an equation or equations to calculate optimal videos or portions of videos as candidates for deletion or compression. For example, if on average, users at a novice level typically review videos 8 hours old, but a manager typically reviews videos 4 hours old, the final weighted mean time period is closer to either 4 or 8 hours depending on how the users and videos, and types of each are weighted. The coefficients are stored in the optimization settings database 210, along with algorithms to optimize video storage. For example, the settings module 206 manages the storage of values and algorithms in the optimization settings database 210.

The optimization engine 200 determines a storage factor for a given video, which can be compared to thresholds for deletion or compression, thus indicating at what point a video should be compressed or deleted. For example, a high storage factor indicates that a video is to be stored for a long period of time before being deleted or compressed, whereas a low storage factor indicates that a video is to be deleted or compressed sooner. As another example, a high storage factor indicates that the video is to be stored in multiple locations (e.g., both the local database 110 and the video database 122). The storage factor is determined by multiplying a personnel-specific metric by an associated weighting coefficient and adding the product of an enterprise-wide metric and its associated weighting coefficient.

The personnel-specific metric is a function of one or more of the metrics recorded by the user activity recorder 116 (e.g. the number of times the video or the video type was reviewed, the number of days since the user reviewed the video, and/or some other activity). For example, the user statistics module 202 determines that the user queries video from a particular camera 90% of the time, and the statistic may be incorporated into a personnel-specific metric and/or the associated coefficient. In the present example, a metric associated with user queries of a particular video is weighted by a coefficient of 0.9. The value of the coefficient for a metric optionally depends on the number of other metrics present in the equation for calculating a storage factor. Furthermore, other personnel-specific and enterprise-wide metrics are weighted appropriately, based on the user statistic. The enterprise-wide metric is a function one or more of the metrics determined by the user statistics module 202 (e.g. aggregate viewing behavior). In the previous example, the 90% statistic may be averaged with statistics associated with the interactions of one or more other users with the video and/or another similar video, or with the camera and/or another similar camera, to determine an enterprise-wide metric and coefficient. The enterprise-wide metric includes other associated data, such as video metadata. For example, video metadata may include information indicating that the video is from a store area associated with a high level of shoplifting, and such information may also be included in the calculation of a storage factor for a video or group of videos. An example of a combination of enterprise-wide metrics and personnel-specific metrics includes information that security officers in retail stores, on average, pause or zoom in on videos 85% of the time, whereas warehouse and distribution center security officers, on average, only pause or zoom in on video 10% of the time. In the present example, based on the video metadata indicating video location, and the metrics related to security officer interaction with the videos, the store videos may be assigned a higher storage factor than the warehouse videos. Similar to the calculation of a storage factor, personnel-specific and enterprise-wide metrics optionally include adding the products of particular metrics and associated weighting coefficients.

The optimization engine 200 uses the storage factor and additional information such as floors, ceilings, or other thresholds to determine methods and strategies for optimizing video storage, and for deleting and compressing video. For example, the optimization engine 200 determines that in general, videos from cameras in the sports section of a retail store older than eight hours are, on average, reviewed by users less than 1% of the time, thus giving those videos a low storage factor. In the present example, if a threshold exists such that videos from the sports section of the store are to be kept a minimum of twenty-four hours, the optimization engine 200 determines the video should be saved, despite the low storage factor. Thresholds are optionally applied after the calculation of a storage factor. As another option, thresholds are used in the calculation of a storage factor, the personnel-specific metric, or the enterprise-wide metric. For example, depending on optimization settings, if a threshold exceeds the value determined by the calculation of an enterprise-wide metric (e.g. where the sports section videos are to be kept a minimum of twenty-four hours), then the threshold replaces the value of the metric. As another option, thresholds are treated as a soft limit or as general guidelines. For example, rather than replacing the value of a particular metric, the threshold value is associated with a relatively large coefficient, thus weighting the equation in favor of the threshold value. In the present example, it is still possible for a metric to exceed the threshold value, but since the equation is heavily weighted in favor of the threshold value, it is not as likely. As another option, values of coefficients depend on the quality or frequency of user activity. For example, if there is a small sample size for a particular metric, or if the values for a metric are widely distributed, a small coefficient is assigned to the metric such that it is not heavily weighted compared to other metrics in the calculation of a storage factor.

The optimization engine 200 uses calculations of the storage factors, enterprise-wide metrics, and personnel-specific metrics to improve settings and algorithms for video optimization, and stores the improvements in the optimization settings database 210. For example, if calculated storage factors are consistently high for a subset of videos, the optimization engine 200 adjusts optimization settings to avoid saving videos unnecessarily. The optimization engine 200 employs such techniques as removing outliers to improve optimization. For example, if one user typically reviews videos from cameras that other users do not typically review, the user behavior data is removed or assigned a reduced weight in order to not significantly affect the aggregate weighted mean of user activity.

Figure 3:
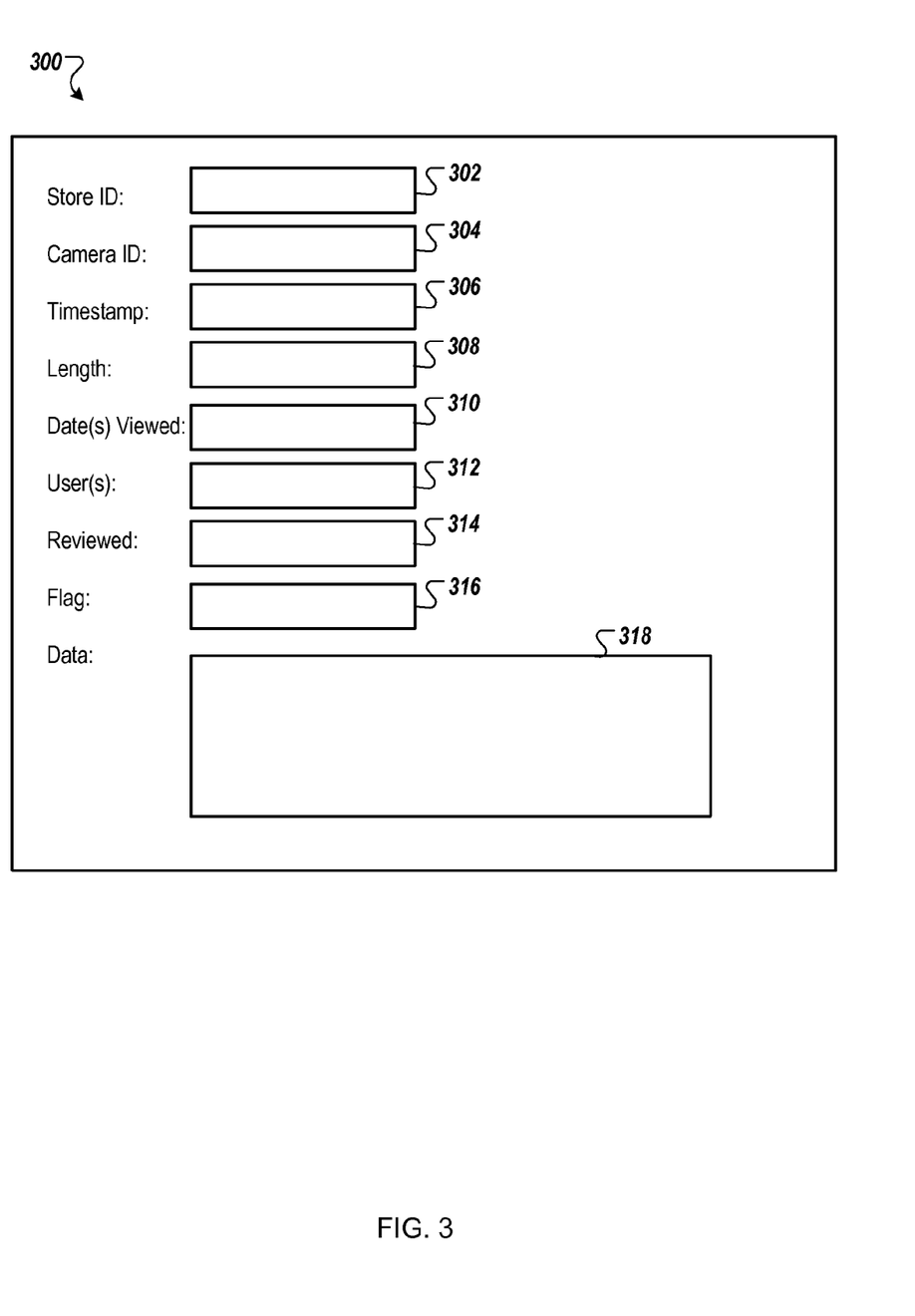
FIG. 3 is a diagram of an example of information stored with a video.

Referring to FIG. 3, a diagram of an example of video information 300 is shown. The video information 300 includes information describing a video, and is associated with the video in the video database 122 (shown in FIG. 1). For example, the video information 300 includes video metadata (e.g. length, date, time) and/or the actual video file. The various components included in the optimization engine 200 (shown in FIG. 2) and the system 100 (shown in FIG. 1) use the video information 300 to determine and implement strategies and methods for optimizing video storage. The optimization engine 126 retrieves video information 300 from the video database 122 via the video information module 204, and uses one or more of the fields in the video information 300 to determine whether to delete or compress a video. Optionally, the video information 300 or similar information exists as metadata stored in association with each video stored in the system 100, and is used to search for videos. For example, if the user submits a query at the workstation 108 for videos associated with a particular date range, the system 100 performs the query based at least in part on the video information 300.

The video information 300 includes a store ID field 302 including information indicating a building number (e.g. a store or warehouse number), geographic location, and/or an address. For example, the user may be restricted to viewing video associated with the store or warehouse of employment, depending on access level. In the present example, the system 100 checks the store ID field 302 to verify that the user is permitted to view the video. Optionally, the optimization engine 200 uses metrics related to information stored in the store ID field 302 to determine a method for storing videos. For example, if one or more users typically view videos from a particular store, the optimization engine 200 uses those statistics to calculate a higher storage factor for videos of similar type for those users and/or related users. Similar to the information in the store ID field 302, other video information fields are optionally used by the optimization engine 200 to calculate video storage factors.

The video information 300 also includes a camera ID field 304 identifying the camera ID and/or the location in which the camera is located. For example, a camera in the loading dock area of a store has a camera ID corresponding to that location. The camera ID field optionally includes camera direction, areas covered by the camera (e.g. men's clothing, sporting goods, etc.), and/or other information related to the camera. For example, the information may be explicitly listed in the camera ID field 304, or encoded within an alphanumeric sequence. In the latter case, the system 100 references the alphanumeric sequence with another source of information, such as a lookup table, to decode the information.

The video information 300 also includes a timestamp field 306 indicating the date and time the video was recorded. Some thresholds for deletion or compression apply to videos with a particular timestamp. For example, a threshold for deletion may indicate that all videos that are not flagged are to be deleted after one month. A timestamp is used by the optimization engine 200 to determine at what time to delete or compress an associated video.

The video information 300 also includes a length field 308 indicating the length of a video segment. Some thresholds for deletion or compression apply to videos of certain lengths. For example, long videos may be candidates for partitioning into shorter length videos, or deleting or compressing irrelevant sections via the compression module 208.

The video information 300 also includes a date(s) viewed field 310 indicating the date and/or time that the video was viewed by a user. The date(s) viewed field 310 optionally includes the first and/or last instances the video was accessed. For example, some thresholds for deletion or compression apply to videos that have not been viewed for a certain number of days. As another option, the field 310 includes multiple dates and/or times corresponding to all instances of one or more users accessing the video. Information in the date(s) viewed field 310 is related to information in the activity database 120, the user database 118 and/or the video database 122. For example, data in the aforementioned databases is populated using information associated with the date(s) viewed field 310.

The video information 300 also includes a user(s) field 312 indicating one or more users having accessed the video. Optionally, the user(s) field 312 includes only the first and/or last user to access a video. For example, some thresholds for deletion or compression apply to videos that have been viewed by particular users, or particular types of users. Preferably, the user(s) field 312 includes multiple users corresponding to all the users having accessed the video. As another option, the user(s) field 312 includes the user or users having witnessed a live presentation of the video (i.e., users who were present when the video was initially recorded). Information in the user(s) field 312 is related to information in the activity database 120, the user database 118 and/or the video database 122. For example, data in the aforementioned databases is populated using information associated with the user(s) field 312, or vice-versa. Information in the user(s) field 312 is indexed against data in the date(s) viewed field 310. For example, entries in the date(s) viewed field 310 are associated with the particular user having viewed the video on the particular date.

The video information 300 also includes a reviewed field 314 indicating the portions of the video that have been reviewed by one or more users. The reviewed field 314 includes frame numbers or time codes corresponding to sections of the video that have been accessed. The information in the reviewed field 314 is indexed against the user(s) field 312 and/or the date(s) viewed field 310. For example, entries in the reviewed field 314 may be associated with a particular user to indicate which portions of the video the user reviewed. Optionally, the reviewed field 314 includes multiple entries indicating all sections reviewed by the user, and particular frame numbers or time codes associated with the video include an indication of the speed at which the user reviewed the video. For example, the user may review portions of the video at normal speed, portions while fast forwarding, and portions in slow motion. The optimization engine 200 determines storage factors for particular portions of the video, based on the user activity information. As another option, the reviewed field 314 simply includes a binary value indicating that either the video has or has not been reviewed.

The video information 300 also includes a flag field 316 indicating whether the video has been flagged. For example, the user may assign a flag to the video to indicate that the video shows an incident (e.g., a safety violation, shoplifting, etc.), and is not to be deleted and/or compressed, but instead should be saved for a potential legal action or for training purposes. The flag is specified by the user, another system, or both, and under certain circumstances, prevents the optimization engine 200 or 126 from deleting and/or compressing the video.

The video information 300 includes a video data field 318 including the actual video data. The video data field 318 optionally includes audio, commentary, and/or other telemetry. Data in the video data field 318 is stored in any number of video formats, such as an MPEG file, or other lossy or lossless formats, or is stored as a pointer to a location where the video is stored.

Figure 4:
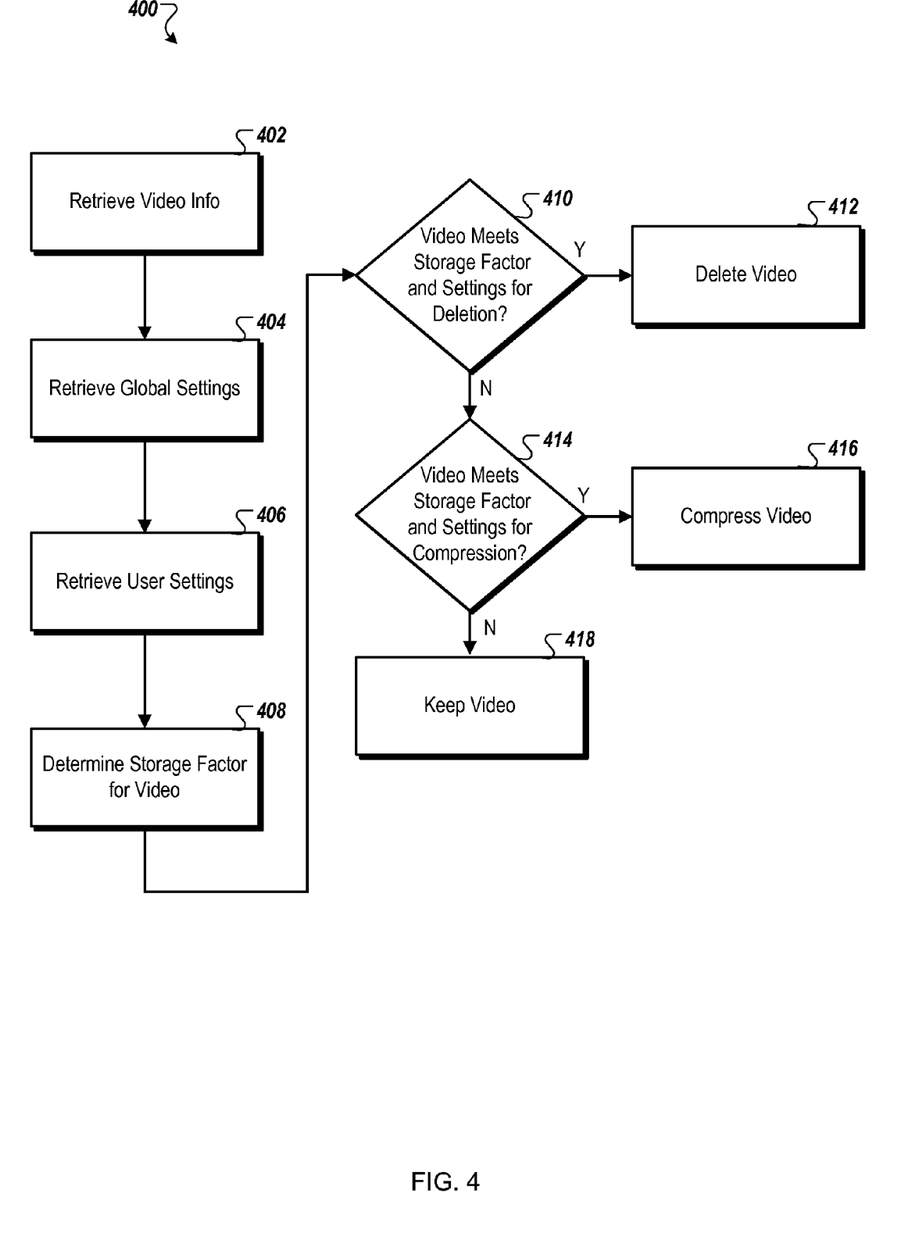
FIG. 4 is a flow chart showing an example process for optimizing storage.

FIG. 4 is a flow chart showing an example process 400 for optimizing video storage. For example, the process 400 is optionally performed by the optimization engine 126 (shown in FIG. 1) or the optimization engine 200 (shown in FIG. 2). For clarity, the following steps are described with regard to the implementation in which the optimization engine 126 performs the example process 400.

In step 402, the optimization engine 126 retrieves video information (e.g., the video information 300, shown in FIG. 3) for a particular video. Additionally, the optimization engine 126 retrieves information from the video database 116, the activity database 120, and/or user database 118.

In step 404, the optimization engine 126 retrieves global settings such as parameters for video retention, and thresholds and/or enterprise-wide metrics from the settings database 124. For example, the optimization engine 126 retrieves global settings indicating a threshold for deletion of videos older than fourteen days, with the exception of flagged videos. As another example, the optimization engine 126 retrieves enterprise-wide metrics indicating that, on average, videos showing the electronics areas of one or more stores are viewed more frequently than videos showing other store areas. The information is optionally retrieved from multiple locations, such as the various databases of the server system 114.

In step 406, the optimization engine 126 retrieves user settings such as user activity statistics, user specified settings, and/or personnel-specific metrics. The optimization engine retrieves user settings from the settings database 124, the user database 118, and/or the activity database 120. For example, the optimization engine 126 retrieves retention policy settings for videos for a group of users, as well as user activity statistics, such as videos or types of videos typically flagged by the group.

In step 408, the optimization engine 126 determines a storage factor for the video, based on the user-specific metrics, the enterprise wide metrics, and the associated weighting coefficients. Optionally, the storage factor is determined by adding the product of a personnel-specific metric and the associated weighting coefficient with the product of a enterprise-wide metric and the associated weighting coefficient. As another option, the storage factor is calculated as a function of all available metrics. For example, multiple metrics may be used to determine the storage factor, enterprise-wide metric, and/or user-specific metrics. If a user does not leave notes associated with the video, for example, the coefficient associated with the metric may be set to zero in order to not influence the storage factor for that video. As another option, the storage factor is a function of one metric, a subset of metrics, or all relevant metrics. For example, if a user never accesses a video, that information may provide a metric, but no additional metrics related to specific viewing patterns (e.g. portions of the video reviewed, fast forwarded, zoomed, etc.) are available for the video.

In step 410, the optimization engine 126 determines whether the video meets a storage factor and settings for deletion. If the video meets the storage factor and settings for deletion, the video is deleted or marked for deletion in step 412. For example, if the retrieved video information indicates that a video is more than fourteen days old, and a global setting or threshold indicates that videos older than fourteen days are to be deleted, then the video is deleted. As another example, if the storage factor for a particular video is high, and the video does not meet any user or global settings for deletion (e.g. the video is not older than a specified number of days, the video shows a low crime area of the store, etc.), then the video is not deleted. As another example, if the storage factor for a particular video is low, and the video does not meet any settings for retention (e.g. the video is flagged, the video has not been reviewed, etc.), then the video is deleted. Optionally, if a video is stored in multiple databases, the video is deleted from one database (e.g., the video database 122), but marked for deletion in other databases (e.g., the local database 110). For example, if the server system 114 communicates once per day with other systems, such as the security system $102_1$, the video on the security system $102_1$ is not immediately deleted. If the video does not meet the storage factor or settings for deletion, for example, then the optimization engine 126 continues to step 414.

In step 414, the optimization engine 126 determines if the video meets a storage factor and settings for compression. For example, if a global setting specifies that videos older than seven days, but not older than fourteen days should be compressed, and the video meets those settings and has a high storage factor, then the video is compressed or marked for compression (e.g., by the compression module 208, shown in FIG. 2) in step 416. If the video does not meet global settings for compression, then the optimization engine 126 continues to step 418, in which the video is kept or saved. Optionally, the video is kept in the original location. As another option, the video is saved to another location, such as another database or on archival media.

The determination steps 410 and 414 optionally include a determination of whether a video meets multiple global or user settings. For example, a series of checks are performed for each set of global or user settings to determine if the video meets those settings. The optimization engine 126 uses combinations of stored algorithms, settings, metrics, and weightings for metrics to determine a storage factor, and thereby determine whether to delete or compress a video. For example, global and user settings exist such that videos having been viewed at least once (live or recorded) from camera locations associated with a low incidence of users pausing or rewinding the captured videos, may be associated with a low storage factor and thus marked for deletion or compression. Optionally, the delete video step 412 and/or the compress video step 416 are performed on a portion or portions of a video rather than the entire video. For example, portions of a video that have been reviewed by a user are deleted, but portions that have not been reviewed are compressed. In some implementations, the process 400 is run on a regular basis (e.g. hourly, daily, weekly, etc.). For example, the server system 114 may execute the process 400 nightly to free up storage space for videos the next day. In some implementations, the process 400 is performed on command (e.g., when a server runs low on video storage space). The global and user settings are optionally different for different systems. For example, a video may be deleted on one system, but compressed on another system, depending on the settings. Optionally, video storage is distributed across multiple systems.

The steps performed in the process 400 are optionally performed in a different order or are repeated multiple times for different users, videos, factors or systems. For example, the process 400 may be performed for videos stored in each of the security systems $102_1$, $102_N$, etc. Optionally, the steps performed in the process 400 are performed on multiple videos simultaneously. For example, the process 400 may be performed on a group of videos associated with the same retail location, date, or user.

Figure 5:
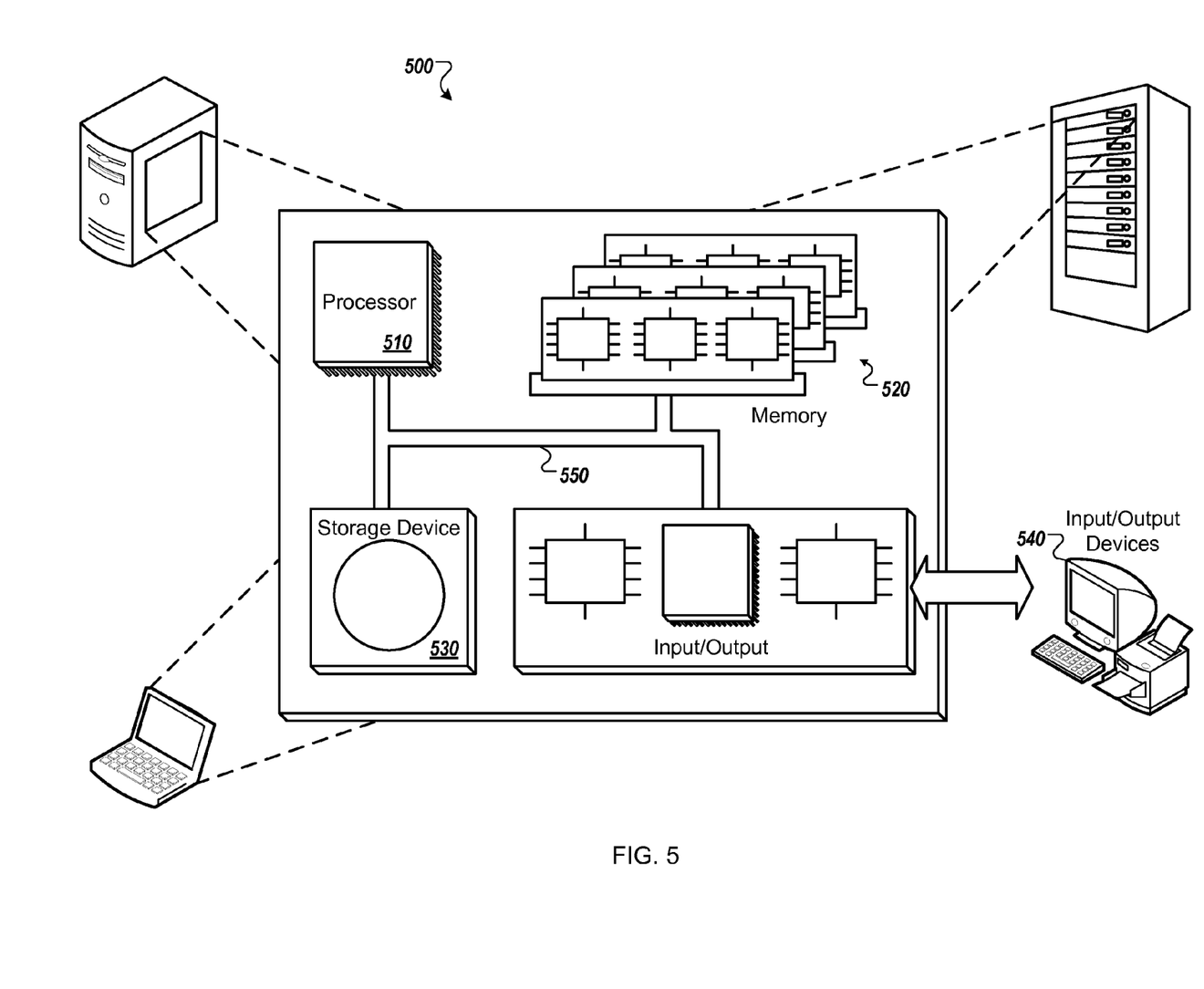
FIG. 5 is a block diagram of a computing system that can be used in connection with computer-implemented methods described in this document.

FIG. 5 is a schematic diagram of a generic computer system 500. The system 500 is optionally used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 is optionally a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

In some examples, the features described are implemented in digital electronic circuitry, or in computer hardware, firmware, software, or in combinations of them. The apparatus is optionally implemented in a computer program product tangibly embodied in an information carrier, e.g., in a machine-readable storage device or in a propagated signal, for execution by a programmable processor; and method steps are performed by a programmable processor executing a program of instructions to perform functions of the described implementations by operating on input data and generating output. The described features are optionally implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that are optionally used, directly or indirectly, in a computer to perform a certain activity or bring about a certain result. A computer program is optionally written in any form of programming language, including compiled or interpreted languages, and it is deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory are optionally supplemented by, or incorporated in, ASICs (application-specific integrated circuits).

To provide for interaction with a user, the features in some instances are implemented on a computer having a display device such as a CRT (cathode ray tube) or LCD (liquid crystal display) monitor for displaying information to the user and a keyboard and a pointing device such as a mouse or a trackball by which the user provides input to the computer.

The features are optionally implemented in a computer system that includes a back-end component, such as a data server, or that includes a middleware component, such as an application server or an Internet server, or that includes a front-end component, such as a client computer having a graphical user interface or an Internet browser, or any combination of them. The components of the system are connected by any form or medium of digital data communication such as a communication network. Examples of communication networks include, e.g., a LAN, a WAN, and the computers and networks forming the Internet.

The computer system optionally includes clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications are optionally made without departing from the spirit and scope of this disclosure. Accordingly, other embodiments are within the scope of the following claims.

What is claimed is:

1. A method of optimizing the storage of enterprise-wide security video, the method comprising:
    semi-continuously or continuously capturing security video footage at a plurality of distributed enterprise locations;
    storing the video footage as a plurality of video files at a centralized location;
    accessing the video files from a plurality of video viewing workstations within the enterprise;
    tracking a plurality of viewing attributes, the attributes including the times of access and the identities of the video files accessed;
    providing an optimization engine to determine a user-centric storage metric and an enterprise-centric storage metric, wherein the user-centric storage metric is based on the frequency with which a distinct category of users accesses video files of a predetermined age at one or more of the video viewing workstations and wherein the enterprise-centric storage metric is based on viewing behavior of at least a representative sample of users within the enterprise, said optimization engine being configured to automatically determine whether to compress or delete video files based on the user-centric storage metric, the enterprise-centric storage metric and a threshold value while preventing video files from being compressed or deleted prior to an initial review by a user, wherein the threshold value is a period of time in which video is to be compressed or deleted and the viewing behavior includes a period of time that lapses before video is viewed; and,
    automatically modifying the threshold value based on the viewing behavior to prevent video files from being compressed or deleted prior to an initial review of the video files by a user.

2. The method of claim 1, wherein at least some of the video viewing workstations are at the distributed enterprise locations.

3. The method of claim 1, wherein a determination is made to compress the video files by storing them in a reduced resolution format or deleting a predetermined percentage of the frames in each video file.

4. The method of claim 1, further including the steps of:
    identifying a subset of video files;
    determining for the subset of video files the user-centric storage metric, the enterprise-centric storage metric and the threshold value; and,
    determining whether to compress or delete the subset of video files based on the user-centric storage metric, the enterprise-centric storage metric, and the threshold value.

5. The method of claim 4, wherein the subset of video files reflects security video footage taken at the same location or type of location within the enterprise.

6. The method of claim 1, wherein the user-centric storage metric is based on the position or title of personnel accessing the video files.

7. The method of claim 1, wherein the user-centric storage metric is based on a probability that video files of a predetermined type and age will be accessed.

8. A system for optimizing security video storage, the system comprising:
    a distributed array of security video systems at a first plurality of locations within an enterprise;
    a primary video storage means for storing video files received from the array of security video systems;
    a distributed array of video viewing workstations at a second plurality of locations within the enterprise;
    a user activity recorder to track the viewing behavior of users at the video viewing workstations; and,
    an optimization engine to determine a user-centric storage metric and an enterprise-centric storage metric, wherein the user-centric storage metric is based on the frequency with which a distinct category of users accesses video files of a predetermined age at one or more of the video viewing workstations and wherein the enterprise-centric storage metric is based on the viewing behavior of at least a representative sample of users within the enterprise, said optimization engine being configured to automatically determine whether to compress or delete video files based on the user-centric storage metric, the enterprise-centric storage metric and a threshold value while preventing video files from being compressed or deleted prior to an initial review by a user, the optimization engine being further configured to automatically modify the threshold value based on the viewing behavior to prevent video files from being compressed or deleted prior to an initial review of the video files by a user, wherein the threshold value is a period of time in which video is to be compressed or deleted and the viewing behavior includes a period of time that lapses before video is viewed.

9. The system of claim 8, wherein at least some of the video viewing workstations are at the first plurality of locations.

10. The system of claim 8, further including:
    a secondary video storage means for converting the video files so that they occupy less storage space and to archive the converted video files, wherein the secondary video storage means compresses the video files by storing them in a reduced resolution format or deletes a predetermined percentage of the frames in each video file.

11. The system of claim 8, wherein the user-centric storage metric is a function of the rank or title of users accessing the video files.

12. The system of claim 8, wherein the enterprise-centric storage metric is based on a probability that video files of a predetermined type and age will be accessed.

13. A method of optimizing the storage of security video of a retail environment, the method comprising:
    capturing security video footage at a plurality of retail locations within a retail enterprise;
    transmitting the video footage for storage as video files at one or more centralized locations;
    viewing the video files at a plurality of video viewing workstations within the retail enterprise;
    tracking viewing behavior exhibited by a plurality of users at the viewing sites, the viewing behavior including the age and identities of the video files accessed;
    providing an optimization engine to determine a user-centric storage metric and an enterprise-centric storage metric, wherein the user-centric storage metric is based on the frequency with which a distinct category of users accesses video files of a predetermined age at one or more of the video viewing workstations and wherein the enterprise-centric storage metric is based on viewing behavior of at least a representative sample of users within the enterprise, said optimization engine being configured to automatically determine whether to compress or delete video files based on the user-centric storage metric, the enterprise-centric storage metric and a threshold value while preventing video files from being compressed or deleted prior to an initial review by a user, wherein the threshold value is a period of time in which video is to be compressed or deleted and the viewing behavior includes a period of time that lapses before video is viewed; and, automatically modifying the threshold value based on the viewing behavior to prevent video files from being compressed or deleted prior to an initial review of the video files by a user.

14. The method of claim 13, wherein a determination is made to compress the video files by storing them in a reduced resolution or frame rate format.

15. The method of claim 13, further including the steps of:
determining, for each of a plurality of subsets of video files, the user-centric storage metric and the enterprise-centric storage metric; and,
determining whether to archive each of the subsets of video files based on the user-centric storage metric, an enterprise-centric storage metric and the threshold value.

16. The method of claim 13, wherein the enterprise-centric storage metric is correlated to a probability that video files of a predetermined type and age will be accessed.

17. A system for optimizing security video storage, the system comprising:
a plurality of security video systems at a first plurality of locations within an enterprise;
a plurality of video viewing workstations at a second plurality of locations within the enterprise;
a user activity recorder to track viewing behavior of users at the video viewing workstations;
an optimization engine to determine a user-centric storage metric and an enterprise-centric storage metric, wherein the user-centric storage metric is based on the frequency with which a distinct category of users accesses video files of a predetermined age at one or more of the video viewing workstations and wherein the enterprise-centric storage metric is based on the viewing behavior of at least a representative sample of users within the enterprise, said optimization engine being configured to automatically determine whether to compress or delete video files based on the user-centric storage metric, the enterprise-centric storage metric and at least one threshold value, said optimization engine further being configured to automatically modify the at least one threshold value based on the viewing behavior of the selected user or group of users to prevent video from being compressed or deleted prior to an initial review by a user, the optimization engine being further configured to automatically modify the at least one threshold value based on the viewing behavior to prevent video files from being compressed or deleted prior to an initial review of the video files by a user, wherein the at least one threshold value is a period of time in which video is to be compressed or deleted and the viewing behavior of the selected user or group of users includes a period of time that lapses before video is viewed.

* * * * *

UNITED STATES PATENT AND TRADEMARK OFFICE
CERTIFICATE OF CORRECTION

Page 1 of 1

PATENT NO. : 8,817,094 B1
APPLICATION NO. : 12/712720
DATED : August 26, 2014
INVENTOR(S) : Brown et al.

It is certified that error appears in the above-identified patent and that said Letters Patent is hereby corrected as shown below:

On the title page item [75], the address "Minneapolis, MA" for second inventor Jason D. Reasoner should read -- Minneapolis, MN --.

Signed and Sealed this
Fourth Day of November, 2014

Michelle K. Lee
*Deputy Director of the United States Patent and Trademark Office*